United States Patent [19]

Akashi

[11] Patent Number: 4,572,643
[45] Date of Patent: Feb. 25, 1986

[54] CAMERA CAPABLE OF OPERATING IN AN AUTOMATIC FOCUS ADJUSTING MODE AND A MANUAL FOCUS ADJUSTING MODE

[75] Inventor: Akira Akashi, Yokohama, Japan
[73] Assignee: Canon Kabushiki Kaisha, Tokyo, Japan
[21] Appl. No.: 570,517
[22] Filed: Jan. 13, 1984

[30] Foreign Application Priority Data

Jan. 17, 1983 [JP] Japan .................................. 58-6069

[51] Int. Cl.⁴ .............................................. G03B 3/00
[52] U.S. Cl. ................................ 354/409; 354/195.1; 354/195.13
[58] Field of Search ............ 354/400, 402, 409, 195.1, 354/195.13

[56] References Cited

U.S. PATENT DOCUMENTS

| | | | |
|---|---|---|---|
| 3,927,414 | 12/1975 | Moriyama et al. | 354/195.1 |
| 4,153,903 | 5/1979 | Pizzuti et al. | 354/195.13 |
| 4,160,587 | 7/1979 | Heiniger et al. | 354/409 |
| 4,191,460 | 3/1980 | Fujiki | 354/409 |
| 4,239,357 | 12/1980 | Iida | 354/409 |
| 4,314,748 | 2/1982 | Kawabata et al. | 354/409 |
| 4,314,750 | 2/1982 | Orban | 354/198 |
| 4,374,613 | 2/1983 | Stempeck | 354/195.13 |
| 4,496,832 | 1/1985 | Sakai et al. | 354/409 |

FOREIGN PATENT DOCUMENTS 0115523 7/1982 Japan ................................. 354/195.1

Primary Examiner—Russell E. Adams
Attorney, Agent, or Firm—Fitzpatrick, Cella, Harper & Scinto

[57] ABSTRACT

This specification discloses a camera which comprises a lens driven by an electric motor and a distance detecting circuit and in which change-over is automatically effected between an automatic focus adjusting mode in which the lens is usually driven by a signal from the distance detecting circuit and a manual focus adjusting mode in which the lens is driven manually when a signal for driving the lens is not put out from the distance detecting circuit, that is, in the case of the concurrence of far focus and near focus of an object to be photographed or in a case where the object to be photographed is of a low contrast, and in which even during the manual focus adjusting mode, the distance detecting circuit is operated and when an in-focus signal is put out from the distance detecting circuit, the lens is stopped for a predetermined time.

18 Claims, 1 Drawing Figure

CAMERA CAPABLE OF OPERATING IN AN AUTOMATIC FOCUS ADJUSTING MODE AND A MANUAL FOCUS ADJUSTING MODE

BACKGROUND OF THE INVENTION

1. Field of the Invention

This invention relates to a focus adjusting apparatus of a photographing instrument such as a camera, and in particular to a focus adjusting apparatus having a power focus function.

2. Description of the Prior Art

An automatic focus adjusting apparatus (hereinafter referred to as the AF apparatus) which automatically effects focusing with respect to an object intended to be photographed has a disadvantage that it cannot execute focusing with respect to an object to be photographed when a plurality of objects to be photographed exist in the same photographing picture plane (such fact will hereinafter be referred to as the concurrence of far focus and near focus) or when distance detection is impossible. That is, during the concurrence of far focus and near focus, when the lens is in focus with respect to any of the objects to be photographed which exist in the photographing picture plane, movement of the lens is locked at that position and therefore, focusing with respect to the object intended to be photographed is not always executed. Thus, it would occur to mind to endow the AF apparatus with the function of driving the lens by a motor while an extraneous operating member such as a push button is being operated, electrically effecting focusing, effecting the detection of the in-focus with respect to the object to be photographed while the photographer is visually recognizing the finder image varied by the focusing, releasing the operation of the above-mentioned operating member when the in-focus with respect to the object intended to be photographed is detected, stopping the driving of the motor at that point of time and manually effecting focusing (hereinafter referred to as the manual focusing function by power focus), and to enable focusing to be executed manually in the case of the concurrence of far focus and near focus or in a case where the contrast of the object to be photographed is so low that malfunctioning is liable to occur during the automatic focus adjustment.

The manual focusing function by power focus can solve the problem of focusing under the concurrence of far focus and near focus, as described above, but the detection of the in-focus must be effected while the photographer himself is visually recognizing the manner of blurring of the finder image, as described above, and this leads to the problem of operability.

For this reason, even when focusing is executed manually the use of the power focus function it would occur to mind to cause the distance detecting function (the in-focus state discriminating function) of the AF apparatus to work to display the in-focus state and thereby facilitate the discriminating of the in-focus state.

On the other hand, when focusing is effected manually by power focus, it is necessary to increase the focusing speed in order to improve the operability and therefore, it is expected to effect the stop-down of the lens at a high speed. However, if the focusing speed is increased, the amount of stop-down of the lens may overrun the position whereat display of the in-focus is effected even if the in-focus state is displayed by the above-described method and at that point of time the operation of the operating member is released to stop the motor.

Even if, for this reason, the technique as known, for example, from U.S. Pat. No. 4,314,750 wherein when a desired exposure condition is obtained while the exposure condition is being varied manually, that is, when in-focus is brought about while the focus adjusting ring of the lens is being manually rotated, a signal is imparted to the photographer's hand by click or brake action to cause the photographer to recognize the in-focus and when the photographer has recognized the in-focus, the rotation of the focus adjusting ring of the lens is stopped is applied to the power focus, the result is nearly equivalent to the function of the ordinary AF apparatus and thus, it has been impossible to solve the problem of malfunctioning under the concurrence of far focus and near focus of the ordinary AF apparatus.

SUMMARY OF THE INVENTION

It is a first object of the present invention to enable, when the manual focusing function by power focus is added to the AF apparatus, the manual focusing function by power focus to be automatically performed when the function of the AF apparatus cannot be performed in the case of the concurrence of far focus and near focus or in a case where the object to be photographed is of a low contrast.

It is a second object of the present invention to solve the above-noted problem by effecting automatic control so that during the manual focusing by power focus, when the detection of in-focus has been effected by the distance detecting operation while focusing is being executed, the driving of the lens is not locked constantly but is stopped for a predetermined time, whereafter the manual focusing by power focus is again effected.

It is also an object of the present invention to realize, as a construction for solving the second problem, a control circuit for causing a distance detecting circuit to operate during the focusing by power focus and stopping the movement of the lens for a predetermined time in response to the in-focus signal from the distance detecting circuit.

The invention will become fully apparent from the following detailed description thereof taken in conjunction with the accompanying drawing.

DETAILED DESCRIPTION OF THE PREFERRED EMBODIMENT

Figure 1:
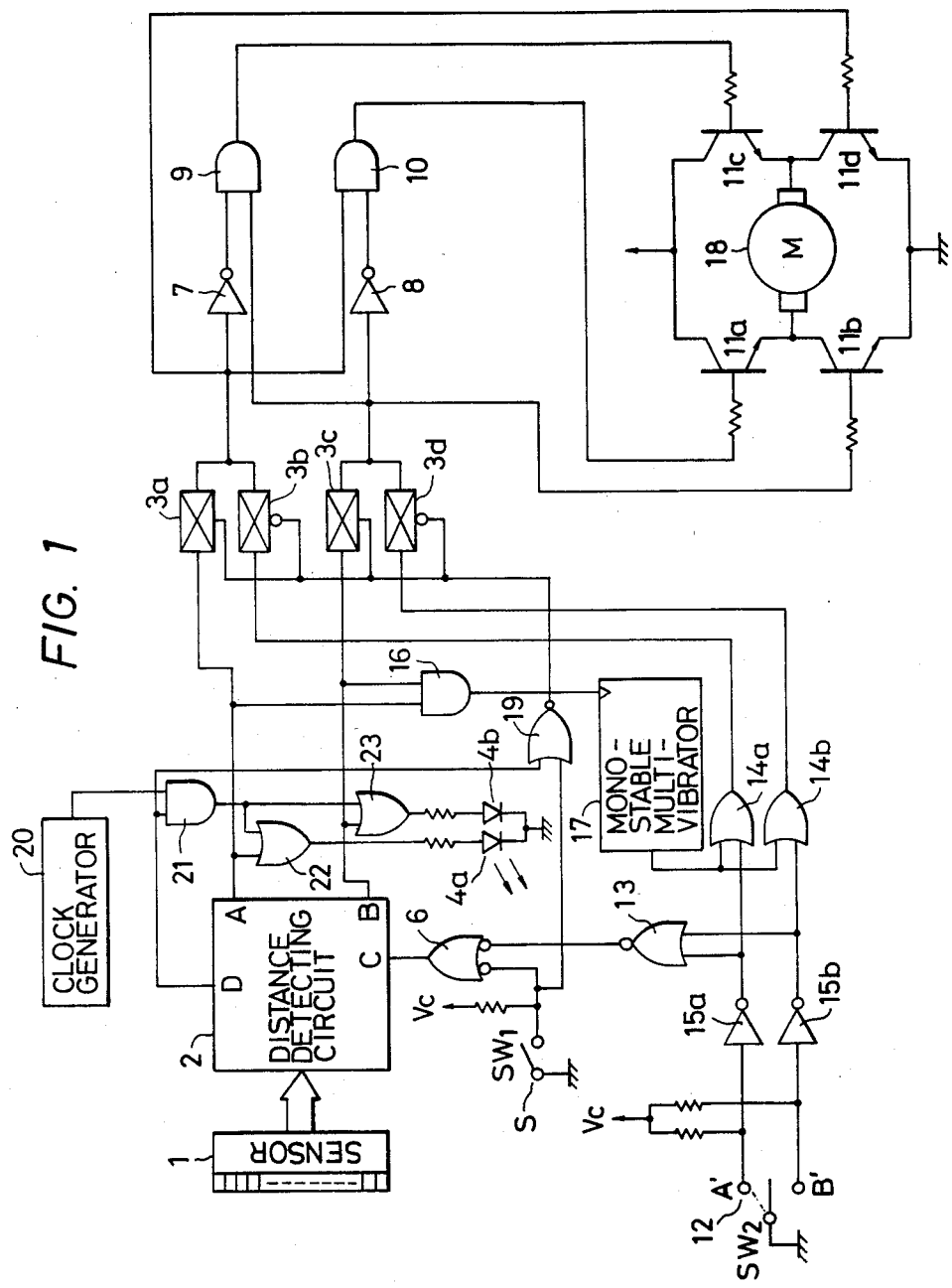
FIG. 1 is a circuit diagram showing an embodiment of the present invention.

Referring to FIG. 1, reference numeral 1 designates a sensor which puts out a signal regarding the focused state with respect to an object to be photographed. The sensor 1 is placed at the focal plane position on the optical path of a photo-taking optical system, forms an image through a photo-taking lens and puts out a signal corresponding to the imaged condition as a signal regarding the focused state. A distance detecting optical system may be provided separately from the photo-taking optical system, an image may be formed on the sensor through the distance detecting optical system and an image signal including focus information may be put out. Further, the output signal may be either a time-sequential signal or a parallel signal, and the sensor is designed to operate at a high speed on real time or to such a degree that the output signal can be regarded sufficiently as real time so that distance detection can be effected even during movement of the phototaking lens. A distance detecting circuit 2 is one known, for example, from U.S. Pat. No. 4,336,450, and judges the focused state in the current focusing situation on real time on the basis of the output of the sensor 1 and, during the so-called near focus, it renders only an output A into high level (hereinafter referred to as "H"), during the far focus, it renders only an output B into "H", during the in-focus, it puts out "H" (in-focus signal) for both outputs A and B, during the down time, it puts out low level (hereinafter referred to as "L") for both outputs A and B, and during the concurrence of far focus and near focus or during the impossibility of distance detection when the object to be photographed is of low contrast, it puts out "H" to D. D corresponds to the OR gate 66 of FIG. 7 in the aforementioned U.S. Pat. No. 4,336,450. This distance detecting circuit operates when "H" is imparted to an input C, and stops operating when "L" is imparted to the input C. This signal is imparted from a normally open switch SW1 through a NAND circuit 6. The constructions of the sensor and metering circuit are well known and need not be described in detail. The switch SW1 is an AF start switch and is, for example, a release switch responsive to a first stroke of the release operation. Display elements 4a and 4b (light-emitting diodes) within the finder are connected to the outputs A and B, respectively, of the distance detecting circuit 2, and during the near focus, the element 4a is turned on, during the far focus, the element 4b is turned on, during the in-focus, both elements 4a and 4b are turned on, during the stoppage of distance detecting operation, both elements 4a and 4b are turned off, and when the distance detecting operation is impossible and therefore the output D of the distance detecting circuit 2 assumes "H", the signal of a clock generator 20 is put out through an AND gate 21 and further, at least one of the display elements 4a and 4b is turned on and off through OR gates 22 and 23 in conformity with the frequency of the clock generator 20.

A group of analog switches 3a–3d are for changing over the lens movement signals of auto focus (hereinafter referred to as "AF") and power focus (hereinafter referred to as "PF"). During AF, the switch SW1 is closed and when the operation of the distance detecting circuit 2 is normal and, the output D is "L" therefore, the output of a NOR gate 19 assumes "H" and the analog switches 3a and 3c become conductive while the analog switches 3b and 3d become non-conductive. In the case of AF, distance detecting circuit signals A and B are supplied to a motor driving control circuit 7-11 through the group of analog switches. During the in-focus, both A and B are "H" and therefore, AND gates 9 and 10 both put out "L" through inverters 7 and 8 and motor driving transistors 11b and 11d are turned on while motor driving transistors 11a and 11c are turned off. Accordingly, both terminals of a motor 18 are grounded and an electrical brake effect occurs. During the near focus, A is "H" and B is "L" and therefore, the AND gate 9 is at "L" and the AND gate 10 is at "H", and the transistors 11a and 11d are turned on while the transistors 11b and 11c are turned off and thus, a current flows through the motor from left to right as viewed in the drawing. During the far focus, the transistors 11b and 11c are turned on while the transistors 11a and 11d are turned off and the current flows from right to left and thus, the lens is moved in the direction opposite to the direction of movement during the near focus. During the stoppage of the distance detecting operation, both outputs A and B are "L" and therefore, all of the transistors 11a–11d are turned off and accordingly, the motor is electrically liberated from the circuit.

During AF when the switch SW1 is closed, and when the object to be photographed is of a low contrast or when the output D of the distance detecting circuit 2 assumes "H" due to the concurrence of far focus and near focus, the output of the NOR gate 19 assumes "L" and the analog switches 3b and 3d become conductive while the analog switches 3a and 3c become non-conductive. Accordingly, the signal from the distance detecting circuit 2 is not applied as an input to the motor 18 but the mode is automatically changed over so that the signal of a switch SW2 is applied as an input to the motor.

The switch SW2 is an operating switch for PF and the terminals A' and B' thereof correspond to the output signals A and B, respectively, of the distance detecting circuit 2. During AF, both terminals A' and B' are open and therefore, these two terminals are pulled up to "H" through a resistor, and the output of a NOR gate 13 becomes "H" through inverters 15a and 15b and the group of analog switches 3a–3d delivers the output signals A and B of the distance detecting circuit 2 to the motor driving control circuit.

When the switch SW1 is not closed and the operating switch SW2 for PF is closed at is terminal A', the terminal A' is grounded and assumes "L" and accordingly, the output of the NOR gate 13 assumes "L". When PF is used, the AF start switch SW1 is usually open, but the distance detecting circuit 2 is operated by the "L" output of the NOR gate 13 through the NAND gate 6, display elements 4a and 4b are driven by the distance detecting circuit 2 in accordance with the far focus, the near focus or the in-focus of the object to be photographed, and the user can operate the operating switch for PF while watching the display of the display elements 4a and 4b.

Again in that case, as previously described, distance detection is effected in real time by the sensor 1 and the distance detecting circuit 2 even during PF and a signal corresponding to the focus condition is put out to the outputs A and B of the distance detecting circuit 2. When the in-focus is judged during the movement of the lens using PF and both of the outputs A and B assume "H", the output of the AND gate 16 assumes "H" and by this rising, a mono-stable multi-vibrator 17 as a one-shot circuit renders its output into "H" for a predetermined time. By this output "H", both of the outputs of the OR gates 14a and 14b assume "H", and the transistors 11b and 11d are turned on by the operation of the aforementioned motor driving control circuit and thus, the motor is stopped for a predetermined time. When the mono-stable multi-vibrator 17 again assumes "L", the outputs of the OR gates 14a and 14b effect an output corresponding to the condition selected by the PF switch SW2 and the motor may be again driven in accordance with this output.

Operation of the FIG. 1 embodiment will now be described. Description will first be made of the case of the manual focusing operation by power focus.

When the switch SW2 is connected to its A' side by operating an extraneous operating member, not shown, the OR gate 14a puts out "H" and OR gate 14b puts out "L", so that "H" is put out from the analog switch 3b and "L" is put out from the analog switch 3d. Thereby, the transistors 11a and 11d are turned on and the transistors 11c and 11b are turned off, as previously described, and a current flows through the motor from left to right as viewed in the drawing, and the lens is driven to shift the focused state with respect to the object to be photographed from the near-focus state toward the in-focus state.

On the other hand, due to the NOR gate 13 assuming "L", the NAND gate 6 is putting out "H" and therefore, the distance detecting circuit 2 is in its operative condition. Consequently, when the in-focus state with respect to the object to be photographed is provided by the above-mentioned driving of the lens, both of the outputs A and B of the distance detecting circuit 2 put out "H", and "H" is delivered from the AND gate 16 and the mono-stable multi-vibrator 17 puts out "H" for a predetermined time. The "H" from the multi-vibrator 17 is transmitted to the analog switches 3b and 3d through the OR gates 14a and 14b and therefore, as described above, the transistors 11a and 11c are turned off while the transistors 11b and 11d are turned on, and the motor 18 is stopped and the lens is stopped at a position whereat it is in focus with respect to the object to be photographed, for a time during which the multi-vibrator 17 puts out "H". By confirming through the finder the object to be photographed which is in the in-focus state during this stoppage of the lens, the operation of the extraneous operating member is released if the object to be photographed which is in the in-focus state is an object intended to be photographed. Thereby, the switch SW2 is shifted to its solid-line position shown and the output of the NOR gate 13 assumes "H", and the distance detecting circuit 2 becomes inoperative and both of the outputs A and B assume "L". Accordingly, the light-emitting elements 4a and 4b are stopped from being driven. Also, all of the outputs of the analog switches 3a–3d are "L" and therefore, as described above, transistors 11a–11d are turned off and thus, the motor 18 is inhibited from being further driven, and the lens continues to stop at the in-focus position with respect to the object intended to be photographed, thus completing the manual focusing.

When the in-focus object to be photographed during the stoppage of the lens by the output "H" of the multi-vibrator 17 differs from the object intended to be photographed, if the extraneous operating member is held in its operative position, the output of the multi-vibrator 17 is inverted to "L" in a predetermined time, whereafter the motor 18 again starts the above-described driving and further focusing is executed.

Consequently, by holding the extraneous operating member in its operative condition until the in-focus with respect to the object intended to be photographed is obtained, the focusing operation with respect to the object intended to be photographed can always be executed manually. Also, when the switch SW2 is connected to its B' side, the direction in which the lens is driven is only reversed and focusing operation is effected manually in a similar manner.

The focusing operation by the AF device will now be described. Description will first be made of a case where the distance detecting circuit 2 operates normally.

First, by effecting a first stroke operation of the release operating member, the switch SW1 is closed. Thereby, the output of the NAND gate 6 assumes "H" and the distance detecting circuit 2 becomes operative. At the same time, the NOR gate 19 puts out "H" and therefore, the analog switches 3a and 3c are selected while the analog switches 3b and 3d become non-conductive. Accordingly, the output of the distance detecting circuit 2 is transmitted to the motor driving control circuit through the switches 3a and 3c and, in the manner as described above, the motor revolves in the direction based on the distance detection output to move the lens in the in-focus direction and, when the lens reaches its in-focus state, both of the outputs A and B are rendered into "H" and, in the manner as described above, the motor 18 is stopped and the lens is locked at the in-focus position, thus completing the focus adjusting operation.

Description will now be made of a case where the operation of the distance detecting circuit 2 is not performed normally due to the low contrast of the object to be photographed or due to the concurrence of far focus and near focus. As in the aforedescribed case where the operation of the distance detecting circuit 2 is performed normally, by the first stroke operation of the release operating member, the distance detecting circuit 2 becomes operative and the output thereof is applied to the transistors 11a–11d through the analog switches 3a and 3c. When the operation of the distance detecting circuit 2 is not normal due to the low contrast of the object to be photographed or due to the concurrence of far focus and near focus and the output D assumes "H", the signal of the clock generator 20 is applied to the display elements 4a and 4b through the AND gate 21 and at least one of the display elements 4a and 4b is turned on and off to inform the user that the operation of the distance detecting circuit is not performed normally. At the same time, the output of the NOR gate 13 assumes "L" and the analog switches 3a and 3c change from their conductive state to their non-conductive state while the analog switches 3b and 3d change from their non-conductive state to their conductive state and thus, the motor 18 is stopped. Then the motor 18 becomes driven by the signal of the PF operating switch SW2. Accordingly, even if the AF start switch SW1 is closed, the user can recognize that the operation of the distance detecting circuit has become abnormal, and can freely drive the photo-taking lens by means of the PF operating switch SW2.

Thus, if the PF operating switch SW2 is connected, for example, to its A' side with the AF start switch SW1 remaining depressed, the transistors 11a and 11d are turned on and the transistors 11c and 11b are turned off with distance detecting circuit 2 remaining operative as in the aforedescribed manual focusing operation by power focus, and a current flows through the motor from left to right as viewed in the drawing and thus, the lens is driven. Accordingly, the focused state of the photo-taking lens is driven from the near focus toward the far focus. When the distance detecting circuit 2 becomes capable of effecting a normal operation due to the contrast of the object to be photographed having become high, the terminal D of the distance detecting circuit 2 changes from "H" to "L", whereupon the output of the NOR gate 19 changes from "L" to "H" and mode again changes from the manual focusing by power focus to the AF in which the motor 18 is automatically controlled by the distance detecting circuit 2.

If the PF operating switch SW2 is closed after SW1 has been opened the display elements have been turned on and off, the aforedescribed manual focusing operation by power focus will be effected.

The embodiment described hitherto and shown in FIG. 1 is a so-called AF priority system in which when the distance detecting circuit 2 is putting out a normal signal, namely, when the output D of the distance detecting circuit 2 is "L", the motor 18 cannot be driven by power focus as long as the AF start switch SW1 is not opened, but where it is desired to construct a so-called power focus priority system in which even when the distance detecting circuit 2 is putting out a normal signal, the power focus can be operated by switching the switch SW2 in order that the will of the user may be more reflected in the focusing, the input of the NOR gate 19 connected to the AF start switch SW1 in the circuit shown in FIG. 1 may be connected not to the AF start switch SW1 but to the output of the NOR gate 13 through an inverter. And, in such a case, if the lens has been driven in PF mode, when the in-focus state is obtained by the distance measuring operation, the motor for driving the lens is primarily stopped and after a predetermined time period, the lens is driven again.

Adoption of such construction leads to the effect that focusing can be immediately accomplished by power focus even when the requirement for focusing is so severe that the user judges that focusing cannot be sufficiently accomplished by AF and the user is depressing the AF start switch SW1 as when the user carries out photography such as a portrait in which the focal length is relatively long with the stop open and with the depth of field being extremely shallow and focusing cannot be accomplished unless the lens position is changed for the eyes and nose of the face of the object to be photographed.

In the present invention, as described above, during the manual focusing by power focus, when the in-focus state has been brought about, driving of the lens is stopped for a predetermined time and therefore, the user can execute focusing manually with great ease while confirming the object to be photographed which is in the in-focus state.

Also, during auto focus, when the operation of distance detecting circuit has become abnormal for some reason or other, the mode is automatically changed over from auto focus to power focus to give the user a warning, thereby enabling the user to immediately effect focusing by power focus. This means very much improved operability.

What I claim is:

1. A focus adjusting apparatus comprising:
   (a) a photo-taking lens whose imaging position is adjustable by varying the lens position;
   (b) manually operated switch means for moving the lens position of said photo-taking lens;
   (c) drive means for varying the lens position of said photo-taking lens by the signal of said manually operated switched means;
   (d) a detecting circuit for detecting the focus state varied by movement of said photo-taking lens and putting out an in-focus signal when the in-focus state is brought about; and
   (e) control means for temporarily stopping the driving of said drive means in response to the in-focus signal from said detecting circuit for detecting the in-focus state.

2. A focus adjusting apparatus according to claim 1, wherein said drive means includes a motor for varying the lens portion of said photo-taking lens.

3. A focus adjusting apparatus comprising:
   (a) a photo-taking lens whose imaging position is adjustable by varying the lens position.
   (b) manually operated switch means for moving the lens position of said photo-taking lens;
   (c) drive means for varying the lens position of said photo-taking lens by the signal of said manually operated switch means;
   (d) a detecting circuit for detecting the focus state varied by movement of said photo-taking lens, putting out an in-focus signal when the in-focus state is brought about, putting out a near-focus signal when said photo-taking lens is in the near-focus state, and putting out a far-focus signal when said photo-taking lens is in the far-focus state;
   (e) a display portion for displaying the in-focus signal, the near-focus signal and the far-focus signal put out by said distance detecting circuit; and
   (f) control means for temporarily stopping the driving of said drive means in response to the in-focus signal from said detecting circuit for detecting the in-focus state.

4. An apparatus comprising:
   (a) a taking lens whose imaging position is adjustable by varying the lens position;
   (b) manually operated switch means for generating a signal to move the lens position of said taking lens;
   (c) drive means for varying the lens position of said taking lens by the signal of said manually operated switch means;
   (d) means for generating a focus signal according to the focus state of said taking lens; and
   (e) control means for temporarily stopping the driving of said driving means by the signal of said manually operated switch means in response to said focus signal.

5. An apparatus according to claim 4, wherein said generaing means generates said focus signal when a focusing state of said taking lens becomes a predetermined state.

6. An apparatus according to claim 5, wherein said predeterined state is an in-focus state.

7. An apparatus according to claim 4, wherein said control means includes:
   (a) time forming means for producing a time signal during predetermined time period in response to said focus signal; and
   (b) control means for stopping the driving of said driving means in response to said time signal.

8. An apparatus comprising:
   (a) a taking lens whose imaging position is adjustable by varying a lens position;
   (b) drive means for varying the lens position of said taking lens;
   (c) focus detecting means for detecting a focus state of said taking lens and for generating a signal for driving said drive means so as to cause a focus state of said taking lens to become an in-focus state;
   (d) manually operated switch means for generating a signal to move the lens position of said taking lens; and
   (e) control means for temporarily stopping the driving of said driving means by the signal of said manually operated switch means in response to the signal of said focus detecting means.

9. An apparatus according to claim 8, wherein said drive means varies the lens position in response to a signal from said focus detecting means when said manually operated switch means does not generate a signal.

10. An apparatus according to claim 8, wherein said control means includes:
(a) time forming means for producing a time signal during predetermined time period in response to the signal of said focus detecting means; and
(b) control means for stopping the driving of said driving means in response to said time signal.

11. An apparatus comprising:
(a) a taking lens whose imaging position is adjustable;
(b) drive means for varying the position of said taking lens;
(c) manually operated means for varying the position of said taking lens;
(d) manually operated means for generating a signal to manually operate said drive means;
(e) focus detecting means for generating a focus state signal to operate said drive means, said focus state signal being a signal for operating said drive means so as to cause a focus state of said taking lens to become an in-focus state;
(f) means for generating a warning signal said warning signal indicating that said detecting means cannot generate a correct focus state signal;
(g) display means for displaying said focus state signal and said warning signal; and
(h) control means for transmitting the signal of said manually operated means prior to said focus state signal to said drive means when said manually operated means generates said signal.

12. An apparatus according to claim 11, wherein said manufally operated means comprising:
(a) a first switch for generating a signal for driving said drive means so as to vary the position of said taking lens in a first direction; and
(b) a second switch for generating a signal for driving said drive means so as to vary the position of said taking lens in a second direction different from said first direction.

13. An apparatus according to claim 11, wherein said display means comprising:
(a) a display element for displaying said focus state signal; and
(b) control means for changing a display mode of said display element to be a mode different from the mode of the display of said focus state signal in response to said warning signal.

14. A focus adjusting apparatus comprising:
(a) a taking lens whose imaging portion is adjustable by varying a lens portion;
(b) drive means for varying the lens position of said taking lens;
(c) focus detecting means for detecting a focus state of said taking lens and for generating a signal for driving said drive means so that said taking lens becomes an in-focus state;
(d) manually operated switch means for generating a signal to move the lens portion of said taking lens;
(e) control means for stopping the driving of said driving means by the signal of said manually operated switch means in response to the signal of said apparatus detecting means, said control means including;
(A) discriminating means for discriminating a signal indicating an in-focus state of said taking lens from the signal of said focus detecting means; and
(B) time forming means for forming the stop signal from the discrimination of said discriminating means during predetermined time period.

15. An apparatus comprising:
(a) a taking lens whose imaging portion is adjustable;
(b) drive means for varying the position of said taking lens;
(c) manually operated means for generating a signal to manually operate said drive means;
(d) focus detecting means for generating a focus state signal to operate said drive means, said focus state signal being a first signal for operating said drive means so that a focusing state of said taking lens becomes an in-focus state, and a second signal indicating that said taking lens is in an in-focus state; and
(e) means for transmitting the signal of said manually operated switch means prior to said second signal to said drive means after said second signal has been generated.

16. An apparatus according to claim 15, wherein said transmitting means transmits the signal of said manually operated switch means prior to said second signal after lapse of the predetermined time period from the generation of said second signal.

17. An apparatus according to claim 16, wherein said transmitting means stops the driving of said drive means until lapse of the predetermined time period from the generation of said second signal regardless of the generation of a signal of said manually operated means.

18. An apparatus according to claim 17, wherein said predetermined time period is determined by a mono-stable-multivibrator which is triggered by said second signal.

* * * * *

UNITED STATES PATENT AND TRADEMARK OFFICE
CERTIFICATE OF CORRECTION

PATENT NO. : 4,572,643

DATED : February 25, 1986

INVENTOR(S) : Akira Akashi

It is certified that error appears in the above-identified patent and that said Letters Patent is hereby corrected as shown below:

Column 1, lines 54-5, change "man-ually the use" to --manually by the use--.

Column 1, line 59, change "discriminating" to --discrimination--.

Column 3, line 3, change "phototaking" to --photo-taking--.

Column 3, line 44, change "as 37 AF")" to --as "AF")--.

Column 4, line 29, change "at is terminal" to --at its terminal--.

Column 5, line 47, change "position," to --condition,--.

Column 7, line 41 change "auto focus" to --autofocus--.

Column 7, line 44, change "auto focus" to --autofocus--.

Column 7, line 56, change "switched" to --switch--.

Column 8, line 2, change "position." to --position;--.

Column 8, line 17, change "distance detecting circuit;" to --detecting circuit;--.

Column 8, line 37, change "generaing" to --generating--.

Column 8, line 41, change "predeterined" to --predetermined--.

Column 9, line 22, change "signal said" to --signal, said--.

UNITED STATES PATENT AND TRADEMARK OFFICE
CERTIFICATE OF CORRECTION

PATENT NO. : 4,572,643

DATED : February 25, 1986

INVENTOR(S) : Akira Akashi

It is certified that error appears in the above-identified patent and that said Letters Patent is hereby corrected as shown below:

Column 9, line 33, change "manufally" to --manually--.

Column 10, line 12, change "apparatus" to --focus--.

Signed and Sealed this

Eleventh Day of November, 1986

*Attest:*

DONALD J. QUIGG

*Attesting Officer*    *Commissioner of Patents and Trademarks*